US009083443B2

(12) United States Patent
Becker et al.

(10) Patent No.: US 9,083,443 B2
(45) Date of Patent: Jul. 14, 2015

(54) INTELLIGENT NOTIFICATION APPLIANCE CIRCUIT AND SYSTEM

(75) Inventors: Donald Edward Becker, Bradenton, FL (US); Dennis Ted Rock, Canaan, ME (US); Morris Stoops, Lenexa, KS (US); Jan A. Braam, Bradenton, FL (US); William Edwards, Bradenton, FL (US); Bruce Ray Montgomery, Jr., Bradenton, FL (US)

(73) Assignee: UTC FIRE & SECURITY AMERICAS CORPORATION, INC., Bradenton, FL (US)

( * ) Notice: Subject to any disclaimer, the term of this patent is extended or adjusted under 35 U.S.C. 154(b) by 1411 days.

(21) Appl. No.: 12/543,626

(22) Filed: Aug. 19, 2009

(65) Prior Publication Data

US 2011/0043367 A1 Feb. 24, 2011

(51) Int. Cl.
G08B 17/12 (2006.01)
H04B 3/54 (2006.01)
G08B 25/06 (2006.01)
H04H 20/61 (2008.01)

(52) U.S. Cl.
CPC ............... *H04B 3/548* (2013.01); *G08B 25/06* (2013.01); *H04B 2203/5441* (2013.01); *H04B 2203/5458* (2013.01); *H04H 20/61* (2013.01)

(58) Field of Classification Search
CPC ......... G01H 1/46; G01H 1/00; G01H 1/0008; G01H 7/004; H04H 60/04; G06F 17/30749; G06F 17/30755; G08B 5/36; G10L 19/167; G10L 19/20
USPC ................. 340/500, 506, 540, 577, 512, 635; 700/90, 94, 80, 81
See application file for complete search history.

(56) References Cited

U.S. PATENT DOCUMENTS

| 5,563,358 | A * | 10/1996 | Zimmerman ............... 84/477 R |
| 6,426,697 | B1 | 7/2002 | Capowski et al. |
| 6,693,532 | B2 | 2/2004 | Capowski et al. |
| 6,737,571 | B2 * | 5/2004 | Furukawa ....................... 84/610 |
| 7,091,847 | B2 | 8/2006 | Capowski et al. |
| 7,170,396 | B2 * | 1/2007 | Kalafarski ..................... 340/326 |
| 7,333,010 | B2 | 2/2008 | Barrieau et al. |
| 7,369,037 | B2 * | 5/2008 | Piccolo et al. ........... 340/286.01 |
| 7,382,245 | B2 | 6/2008 | Girouard |
| 7,945,296 | B2 * | 5/2011 | Hubert et al. ................. 455/574 |
| 2003/0080865 | A1 | 5/2003 | Capowski et al. |
| 2004/0225388 | A1 * | 11/2004 | Zhang et al. ..................... 700/94 |
| 2005/0128097 | A1 * | 6/2005 | Piccolo et al. ............. 340/691.1 |
| 2006/0214811 | A1 | 9/2006 | Barrieau et al. |
| 2007/0115111 | A1 | 5/2007 | Girouard |
| 2008/0180229 | A1 | 7/2008 | Piccolo, III et al. |
| 2011/0317861 | A1 * | 12/2011 | Haase ........................... 381/333 |

\* cited by examiner

*Primary Examiner* — George Bugg
*Assistant Examiner* — Edny Labbees
(74) *Attorney, Agent, or Firm* — Cantor Colburn LLP

(57) ABSTRACT

An intelligent notification appliance circuit has a controller and one or more addressable notification appliances coupled with a single pair of wires. The controller outputs integrated power, audio and control signals, and transmits the integrated signals to the one or more addressable notification appliances. Thus, the one or more addressable notification appliances are powered, operated, controlled, and monitored using the intelligent notification appliance circuit. When the intelligent notification appliance circuit is implemented in a fire and/or mass notification system, that system is able to provide integrated audio signals, power signals and control signals over a single pair of wires. The integrated audio signals may carry data indicative of live or recorded music and/or voice messages, such as: mass notification messages, general page, voice evacuation, and the like.

17 Claims, 5 Drawing Sheets

INTELLIGENT NOTIFICATION APPLIANCE CIRCUIT AND SYSTEM

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The field of the invention relates to fire systems and mass notification systems generally, and more particularly to certain new and useful advances in the integration of analog audio signals and/or control signals with power signals over a single pair of wires, of which the following is a specification, reference being had to the drawings accompanying and forming a part of the same.

2. Description of the Related Art

Many known notification device systems use reverse polarity circuits that are supervised by an end of line resistor. The notification devices themselves are simple on/off devices with a diode. The diode completes the power circuit for the device when the circuit polarity is reversed. Each of the notification devices must have the same or similar operating characteristics because each is a simple on/off mechanism.

Another known type of notification system provides individual control and operation of each notification device by using voltage levels and current draws as a signaling method. Some known technologies, such as Power-over-Ethernet, exist for distributing power combined with audio, monitoring and control, but all are of relatively low power and span relatively short distances. They are not capable of powering amplified audio and/or visual signals over the distributed topography of a fire zone, mass notification zone, security zone, and the like for a building, an installation, a campus, etc.

Moreover, none of the above-described systems provide soft circuits, and none integrate audio distribution onto power wiring and/or monitoring and control wiring.

BRIEF SUMMARY OF THE INVENTION

An intelligent notification appliance circuit ("INAC") is disclosed for use in a notification system, such as a fire notification system, a mass notification system or a combined fire/mass notification system. In an embodiment, the INAC comprises one or more addressable notification appliances and a controller operative to transmit a power signal mixed with at least one of an audio signal and a control signal to the one or more addressable notification appliances when the controller is coupled with the one or more addressable notification appliances via a single pair of wires. The controller may also be operative to filter and process monitoring signals that are transmitted over a power line from the one or more addressable notification appliances. The audio signals may be encoded for baseband signalling or FM signalling. The control signals and the monitoring signals may each be encoded for AM signalling.

The one or more addressable notification appliances may each be equipped with a wireless transceiver and operative to receive installer commands or user commands in the form of wireless configuration signals, wireless programming signals, wireless control signals and/or wireless audio signals from a wireless handheld device. Such addressable notification appliances may also be operative to transmit one or more appliance messages back to the handheld device in response to the received installer command(s) or user command(s).

A handheld device is also disclosed which is operative to transmit wireless configuration signals, wireless control signals, wireless programming signals and/or wireless audio signals to the one or more addressable notification appliances. The handheld device can be used by an installer or user of the INAC to configure, program or control, as the case may be, the one or more addressable notification appliances before, during or after their installation. This is particularly advantageous where a large number of addressable notification appliances are being (or have been) installed and/or where one or more addressable notification appliances have been installed in hard-to-reach places. In one embodiment, the handheld device is a component of a notification system having an INAC.

The INAC is operative to provide one or more soft circuits for: fire emergency page, mass notification emergency page, background music, non-emergency page, fire visible strobe, mass notification visible strobe, fire audible horn, mass notification audible horn, fire text message, mass notification text message, and the like.

Other features and advantages will become apparent by reference to the following description taken in connection with the accompanying drawings.

BRIEF DESCRIPTION OF THE SEVERAL VIEWS OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

Figure 1:
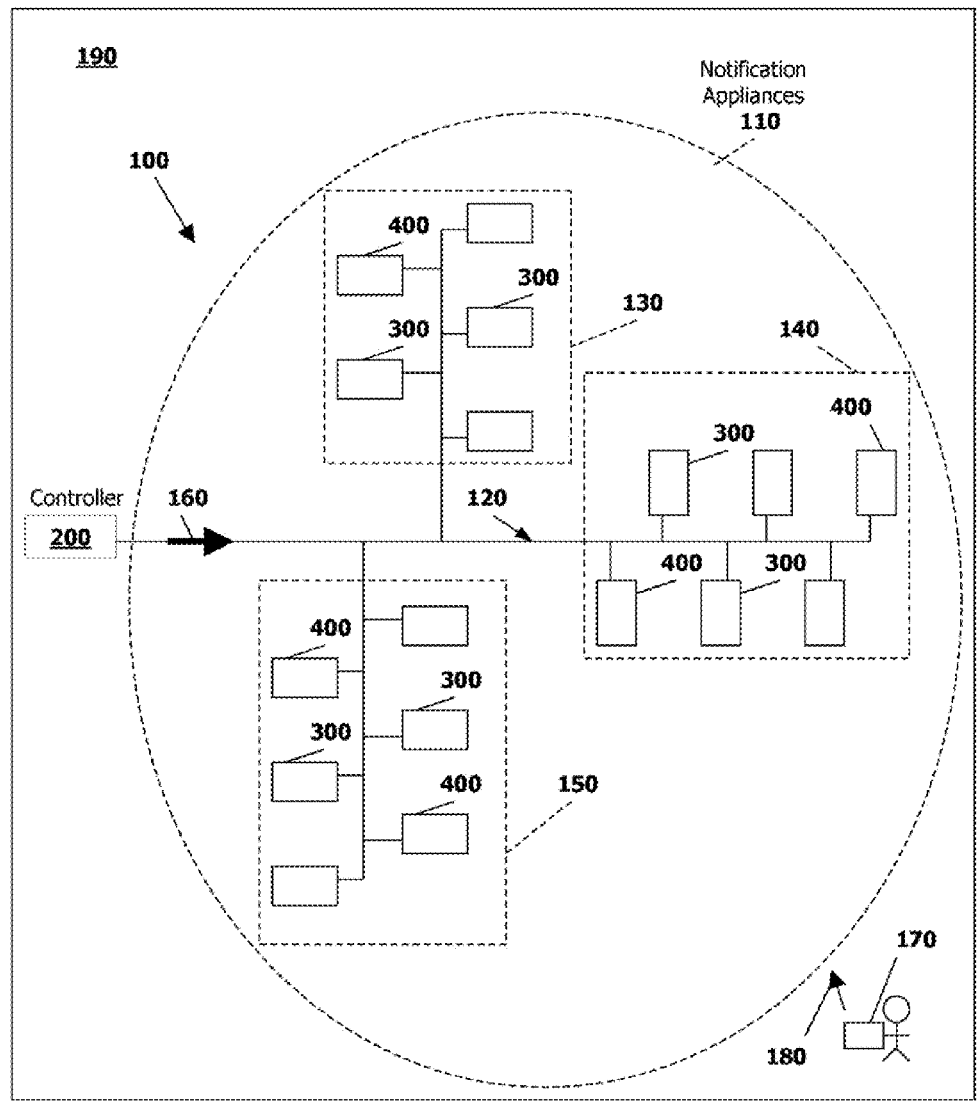
FIG. 1 is a diagram of an embodiment of an intelligent appliance notification circuit ("INAC")

Referring to FIG. 1, an intelligent notification appliance circuit ("INAC") 100 has an INAC controller 200 (hereinafter, "controller 200") and one or more addressable notification appliances 110 coupled with a single pair of wires 120.

The controller 200 outputs signals 160, which are power signals mixed with encoded analog audio and/or encoded control signals, and transmits the signals 160 over the single pair of wires 120 to the one or more addressable notification appliances 110, each of which uses a filter to isolate the encoded analog audio and/or control signals, and thereafter decodes and processes them to operate various other components such as fire emergency strobes, mass notification emergency strobes, fire emergency horns/bells, mass notification horns/bells, fire emergency graphical and/or textual displays, mass notification graphical and/or textual displays, amplified speakers, and so forth. Thus, the one or more addressable notification appliances 110 are powered, operated, controlled and/or monitored using the INAC 100. In one embodiment, the controller 200 supplies DC power and encodes both audio transmission and control interaction with the one or more addressable notification appliances 110, and initiates all communications, whether broadcast or point-to-point.

The addressable notification appliances 110 may comprise one or more types 300 and 400, each of which is explained in detail below with respect to FIGS. 3 and 4, respectively. Depending on its type 300 or 400, an addressable notification appliance 110 may comprise one or more of: light source(s), audio amplifier(s), audio speaker(s), audible horn(s) and/or bell(s), graphical and/or textual display(s), and the like, and/or combinations thereof. Additionally, each addressable notification appliance 110 comprises a microprocessor that provides supervision and control functions. The microprocessor performs—and/or causes to be performed—the actions specified in computer-readable instructions received from the controller 200.

The controller 200 is configured to encode live or recorded audio signals in either baseband or FM signaling, and capable of upper limit frequency response of up to, and including, about 20 KHz. The controller 200 is further configured to mix the encoded audio signals with the power signal. For a type of addressable notification appliance 400 that comprises an amplifier and a speaker, the audio signals will be isolated from the power signal using a filter, decoded, amplified to the desired sound pressure level, and used to drive the audio speaker.

Similarly, the controller 200 is also configured to mix control signals, carried by a modulated signal that is capable of data communication rates in a range of, and including, about 300 baud to about 4,800 baud, with the power signal. In an embodiment, one or more of the addressable notification appliances is/are configured to transmit monitoring signals in a modulated signal that is capable of data communication rates in a range of, and including, about 300 baud to about 4,800 baud, back over the power line to the controller 200, where they are isolated from the power signal using a filter and thereafter decoded and processed. The modulated signal may be modulated using any suitable modulation technique, non-limiting examples of which are Interrupted Continuous Wave ("ICW"), On-Off Keying ("OOK") and the like.

In the exemplary embodiment, the power distribution for the INAC 100 is DC power, at a nominal voltage range of, and including, about 24 Vdc to about 30 Vdc. These features are provided merely for illustrative purposes, and should not be used to limit the scope of the claimed invention, as any suitable power distribution, type of carrier signal, communication rate and/or combinations thereof can be used in other embodiments.

Advantageously, up to about sixty (60) addressable notification appliances 110 may form the INAC 100, with a maximum length of wire between the controller 200 and a last addressable notification appliance of about 300 meters (approximately 1,000 feet).

Remote Configuration and/or Diagnostics of Intelligent Notification Appliances

Figure 5:
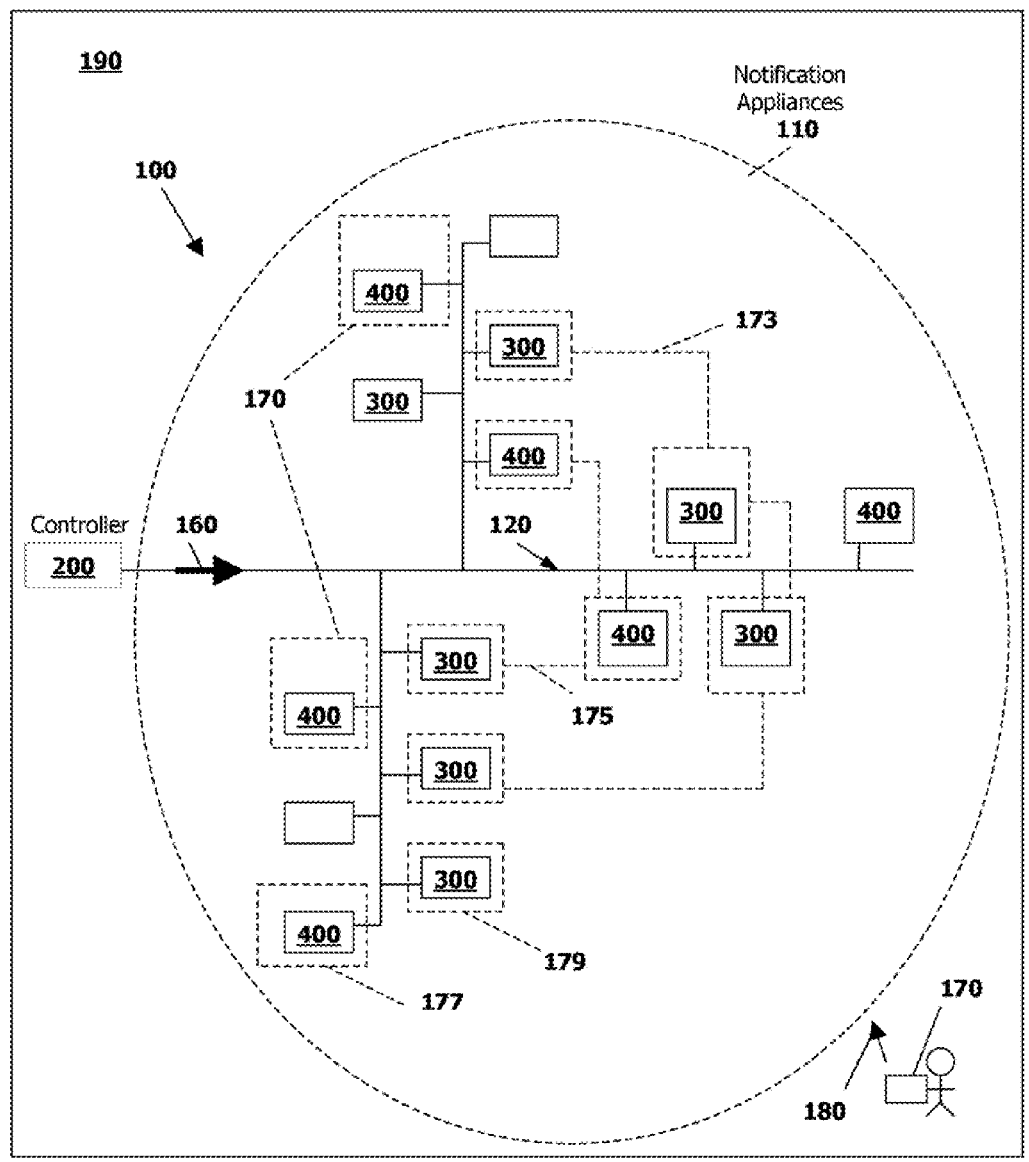
FIG. 5 is a diagram of the INAC of FIG. 1 that illustrates additional soft circuits.

As further depicted in FIG. 1, a system 190 may comprise an INAC 100, and optionally, a hand-held remote control device 170, which transmits installer and/or user commands via a wireless signal 180 to one or more of the addressable notification appliances 110. In such an embodiment, one or more of the addressable notification appliances 110 comprises a wireless transceiver. Additionally or alternatively, the device 170 may transmit installer and/or user commands via a wireless signal 180 to one or more soft circuits 130, 140 and 150. In one embodiment, the handheld device 170 may transmit installer commands or user commands to the controller 200, which is operative to relay such commands over the singe pair of wires 120 to the one or more addressable notification appliances 110 or to one or more of the soft circuits 130, 140, 150, 170, 173, 175, 177 and 177 (FIGS. 1 and 5).

Any type of wireless signal 180 may be used. Examples include, but are not limited to, infrared ("IR") and radio frequency ("RF"). Inclusion of the handheld device 170 and configuring it and one or more of the addressable notification appliances 110 to wirelessly communicate with each other marks a significant advantage over known notification systems, whose notification devices are only hard-wired and cannot be configured and programmed except by direct physical access.

The wireless signal 180, which may be transmitted by either the device 170 or by an addressable notification appliance 110, can carry any suitable installer command, end user command and/or monitoring signal.

The installer commands may be wireless configuration signals that cause a microprocessor in an addressable notification appliance to set or adjust a customizable setting, such as decibel level of fire audible horn, decibel level of mass notification audible horn, candela output of fire strobe, candela output of mass notification strobe, brightness/color of fire emergency text message, brightness/color of mass notification emergency text message, amplifier adjustment, etc. Installer commands may also be wireless audio signals that cause a microprocessor in an addressable notification appliance to play or broadcast a test fire emergency page, a test mass notification emergency page, a test non-emergency page, test background music, and the like. Installer commands may also be wireless control signals that cause a microprocessor in an addressable notification appliance to adjust the volume and/or selection of background music, to display a test fire emergency text message, to display a test mass notification emergency text message, to initiate a status check, to initiate a horn/bell test, to initiate a strobe test, etc. Installer commands may also be wireless programming signals that cause the microprocessor(s) of one or more predetermined addressable notification appliances to form one or more soft circuits, which are explained further below.

User commands may be wireless audio signals that cause a microprocessor in an addressable notification appliance to play or broadcast a fire emergency page, a mass notification emergency page, a non-emergency page, background music, and the like. User commands may also be wireless control signals that cause a microprocessor in an addressable notification appliance to adjust the volume and/or selection of background music, to display a fire emergency text message, to display a mass notification emergency text message, to initiate a status check, to initiate a horn/bell test, to initiate a strobe test, and so forth.

Appliance messages are any type of messages wirelessly transmitted from an addressable notification appliance 110 back to the handheld device 170 in response to an installer command and/or a user command.

In an alternative embodiment, the controller 200 may be equipped with a wireless transceiver and configured to route wireless signals between the device 170 and one or more of the addressable notification appliances 110.

Soft Circuits

The INAC 100 can be configured to provide one or more soft circuits, each of which is a virtual circuit within the INAC 100 that is associated with a particular, pre-defined category. Example categories of soft circuits include, but are not limited to: fire emergency page, mass notification emergency page, background music, non-emergency page, fire visible strobe, mass notification visible strobe, fire audible horn, mass notification audible horn, fire text message, mass notification text message, and the like. Examples of additional categories for which one or more soft circuits may be provided are, but are not limited to: tornado warning, hurricane warning, flood warning, security alarm, and so forth.

To not complicate the drawing or its description unnecessarily, FIG. 1 only shows three soft circuits 130, 140 and 150. Accordingly, it is contemplated that embodiments of the INAC 100 may have any number of soft circuits. For example, FIG. 5 illustrates another embodiment of INAC 100 in which individual addressable notification appliances and combinations thereof have been configured to form soft circuits 170, 173, 175, 177 and 179. By way of illustration only, and not limitation, soft circuit 170 has only two addressable notification appliances 400, all of the same type; soft circuit 173 has only four addressable notification appliances 300, all of the same type; soft circuit 175 has two addressable notification appliances 400 and one addressable notification appliance 300; soft circuit 177 has a single addressable notification appliance 400; and soft circuit 179 has a single addressable notification appliance 300.

Referring to FIGS. 1 and 5, each soft circuit 130, 140, 150, 170, 173, 175, 177 and 179 may be constructed, at least in part, based on the types 300, 400 and/or locations, of addressable notification appliances 110, and/or combinations thereof, that comprise the INAC 100. For example, with reference to FIG. 1, assume that addressable notification appliances 300 could only activate a fire alarm strobe and that addressable notification appliances 400 could only activate a speaker and/or a mass notification strobe. With these assumptions in mind, each of soft circuits 130, 140 and 150 then represents a combination fire/mass notification category, and each soft circuit 130, 140 and 150 is configured to activate either fire strobes or mass notification strobes/speakers in various predetermined areas, of a building, installation, campus, etc. as the need arises. Alternatively, referring to FIG. 5, a soft circuit 173 for fire notification may comprise only and all of the addressable notification appliances 300. Another soft circuit 179 may comprise only a geographical portion (floor, wing, building, area of installation, area of campus, etc.) of the addressable notification appliances 300. Similarly, a soft circuit 170 for mass notification may comprise only and all of the addressable notification appliances 400. Another soft circuit 177 may comprise only a geographical portion of the addressable notification appliances 400.

When the intelligent notification appliance circuit 100 is implemented in a system 190, that system can provide audio signals, control signals, monitoring signals and/or power signals over the single pair of wires 120. Examples of the system 190 include, but are not limited to: a fire system, a mass notification system, a security system, and the like. The audio signals, which are integrated onto the power and/or control/monitoring line, may carry data indicative of live or recorded music and/or of voice messages, such as: mass notification messages, general page, voice evacuation, and the like.

Intelligent Notification Controller and Appliances

Figure 2:
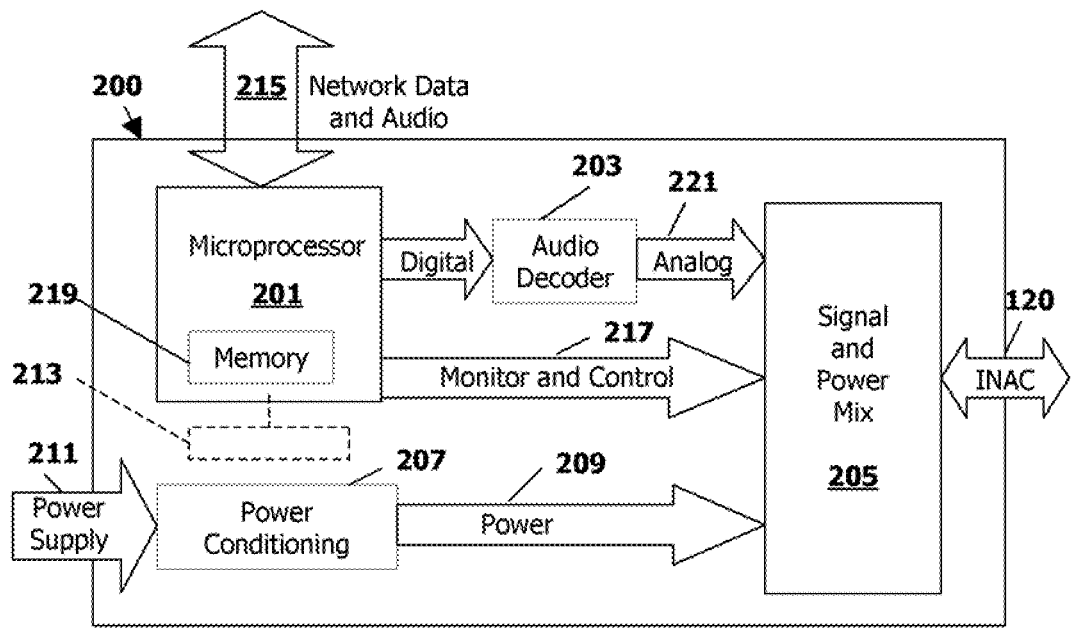
FIG. 2 is a diagram of an embodiment of an INAC controller.

Referring to FIG. 2, the controller 200 (of FIG. 1) comprises a microprocessor 201 coupled with a memory 219. The controller 200 further comprises a power conditioning unit 207, which is configured to couple with a DC power supply 211 and to output conditioned power 209 for distribution over a single pair of wires 120 that connect components of the INAC 100 (of FIG. 1). The microprocessor 201 receives digital network data and/or a digital audio signal 215 and routes the same to an audio decoder 203, which converts the digital audio signal into an analog audio signal 221. The analog audio signal 221, together with a monitoring and/or control signal 217 output by the microprocessor 201, and together with the conditioned power 209 output by the power conditioning unit 207 are transmitted to a signal and power mixing unit 205. The signal and power mixing unit 205, in turn, mixes and transmits the analog audio signal 221, the monitoring and/or control signal 217, and the conditioned power 209 over the single pair of wires 120 to the one or more soft circuits 130, 140, 150, 170, 173, 175, 177 and 179 (FIGS. 1 and 5).

The controller 200 may further comprise a wireless transceiver 213 for communicating with a handheld device 170 (in FIGS. 1 and 5).

Figure 3:
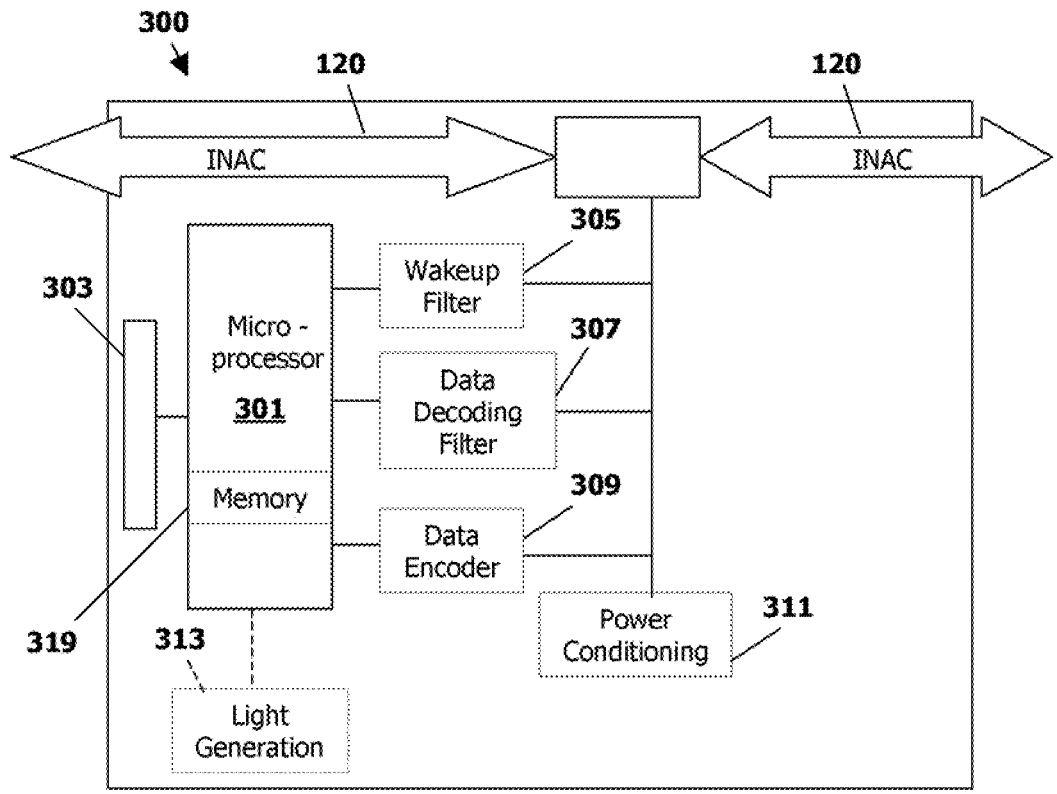
FIG. 3 is a diagram of an embodiment of a first type of addressable notification appliance.

Referring to FIG. 3, an addressable notification appliance 110 (FIGS. 1 and 5) of the type 300 may comprise a microprocessor 301 coupled with a memory 319. In response to computer executable instructions retrieved from the memory 319, the microprocessor 301 operates a wireless transceiver 303, a wakeup filter 305, a data decoding filter 307, a data encoder 309, and—optionally—a light generator 313, which may comprises a strobe and/or a light emitting diode ("LED"). Optionally, the microprocessor 301 and the wireless transceiver 303 may be integrated into a single chip package. The addressable notification appliance 300 further comprises a power conditioning unit 311, which is coupled with the single pair of wires 120 and which functions to further condition the power 209 received from the controller 200 (FIGS. 1 and 2). The microprocessor 301 is coupled with the power conditioning unit 311. A wakeup filter 305 is coupled between the microprocessor 301 and the power-conditioning unit 311, and is configured to isolate a wakeup signal from the conditioned power signal transmitted from the controller 200 (FIG. 1) over the single pair of wires 120 (FIG. 1), and to output the isolated wakeup signal to the microprocessor 301 for processing. A data decoding filter 307 is coupled between the microprocessor 301 and the power conditioning unit 311, in parallel with the wakeup filter 305. The data decoding filter 307 is operative to isolate the control signal from the conditioned power signal, to decode the isolated control signal, and to output the isolated, decoded control signal to the microprocessor 301 for processing. A data encoder 309 is coupled between the microprocessor 301 and the power conditioning unit 311, in parallel with the wakeup filter 305 and the data decoding filter 307. The data encoder 309 is operative to encode a monitoring signal outputted by the microprocessor 301 for transmission over the single pair of wires. The wireless transceiver 303 may be used to send and receive wireless signals 180 (FIG. 1) between the addressable notification appliance and the handheld device 170.

Figure 4:
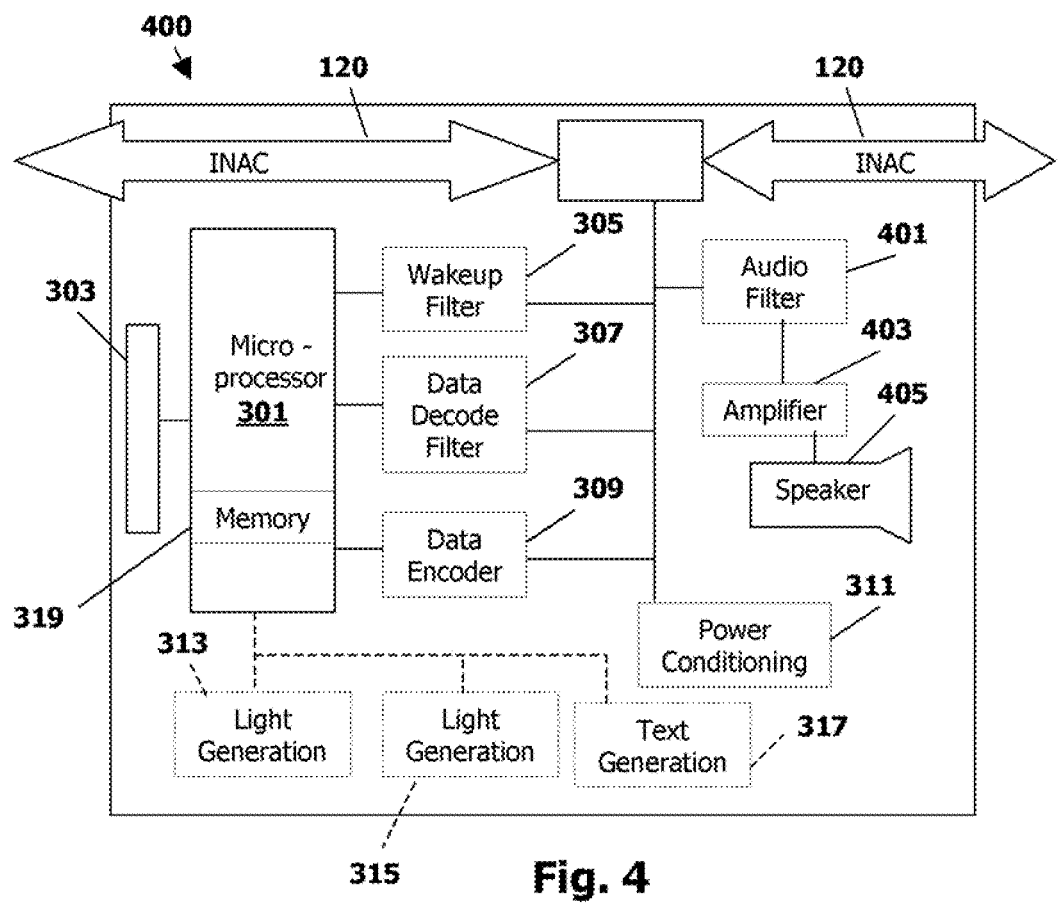
FIG. 4 is a diagram of an embodiment of a second type of addressable notification appliance.

Referring to FIG. 4, an addressable notification appliance 110 (FIG. 1) of the type 400 may comprise the microprocessor 301, memory 319, wireless transceiver 303, a wakeup filter 305, data decoding filter 307, data encoder 309, and power conditioning unit 311 described above. Additionally, the addressable notification appliance 400 may further comprise an audio filter 401, which is coupled with an amplifier 403 and with the microprocessor 301. The amplifier 403 is coupled with a speaker 405. The audio filter 401 is operative to isolate the analog audio signal from the conditioned power signal, to decode the isolated analog audio signal, and to output the isolated, decoded analog audio signal to the amplifier 403. The amplifier 403 boosts the processed audio signals to a predetermined sound pressure and outputs the amplified audio signals to the speaker 405, which produces sound.

The addressable notification appliance 400 may further optionally comprise a first light generator 313, a second light generator 315, a graphical and/or textual generator 317, and/or any combination or subset thereof. Each of the light generators 313 and 315 may comprise a strobe and/or a LED. The first light generator may be a fire emergency strobe. The second light generator may be a mass notification strobe.

Handheld Device

Figure 6:
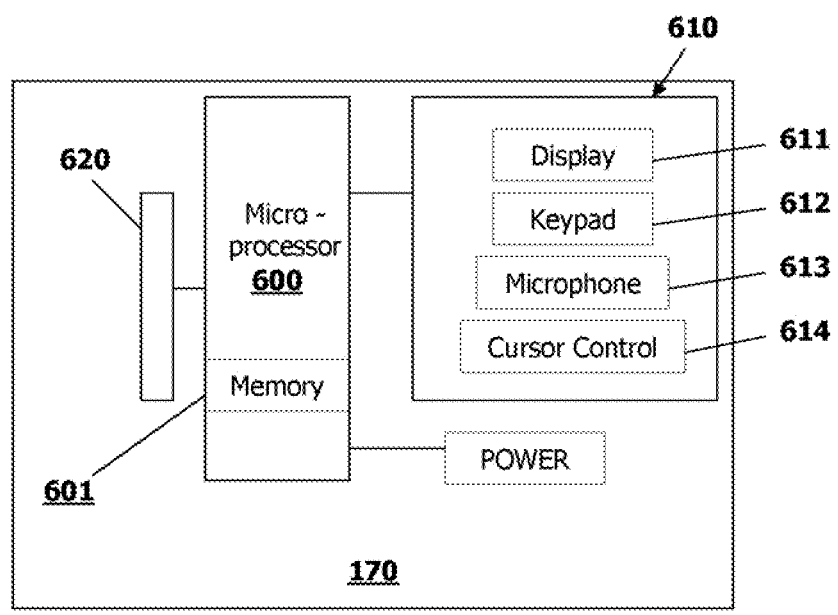
FIG. 6 is a diagram of an embodiment of a handheld device that may be used to configure, program and/or control one or more addressable notification appliances.

FIG. 6 is a diagram illustrating an embodiment of the handheld device 170 shown in FIGS. 1 and 5. The handheld device 170 has a microprocessor 600 having a memory 601. A user interface 610 is coupled with the microprocessor 600 and is operative to convey user commands or installer commands to the microprocessor 600 for processing. The user interface 610 may include a display 611, a keypad 612, a microphone 613, and/or a cursor control 614. Optionally, the display 611 may be a touch screen. A wireless transceiver 620 is coupled with the microprocessor 600 and operative to transmit the user commands or the installer commands in the wireless signal 180 (FIGS. 1 and 5) for receipt by one or more addressable notification appliances 110 (FIGS. 1 and 5) that are operative to be components of an intelligent notification appliance circuit 100 (FIGS. 1 and 5).

Other Features

Referring again to FIG. 1, one or more embodiments of the system 190, and/or the INAC 100, may have one or more of the following features and/or advantages, and/or any combination thereof:

Reduced wire runs: use of addressable notification appliances 110 allows at least point-to-point communications between the controller 200 and the appliances 110.

Existing wire use: Existing visual and audible wire can be used in upgrading to an audio system. This means that mass notification audio, general page, background music, and voice evacuation can be delivered to existing facilities without the expense of replacing the existing wire runs.

Non-emergency use: The communication paths and devices can be supervised for continued operation while active. Circuit ground fault can be supervised while active. This allows use of the INAC 100 for non-emergency functions such as general purpose paging and background music.

End user control: Equipped with the handheld device 170, an end user can control the non-emergency functions of one or more of the addressable notification appliances 110. Background music can be switched on/off. Background music and general purpose paging volume can be controlled. These non-emergency user settings are over-ridden by the installed emergency settings when the circuit is used for emergency signaling.

Restricted operation: When being utilized for general purpose paging and background music, the controller 200 can be configured to activate only a subset of the amplified speakers 405 (FIG. 4). This allows easy control limiting the noise and interruptions to desired areas of a predetermined zone or soft circuit 130, 140 and 150.

Reduced circuits and wiring: As mentioned above, the amplified speakers, visible strobe signals, audible horn signals, and other signaling devices can be powered, operated, controlled and monitored over an INAC with a single pair of wires.

Synchronization of signals: Audible and visible signals can be synchronized via a broadcast communication method to ensure all visible signals are synchronized within about 10 msec and all audible signals are synchronized within about 50 msec.

Configuration: IR, RF or other type of electromagnetic communications between the handheld device 170 and one or more of the addressable notification appliances 110, during installation, saves time and expense by allowing installers to remotely program installed addressable notification appliances 110.

Configuration backup: In the exemplary embodiment, the controller 200 is configured to load and archive a configuration from an addressable notification appliance 110. If an addressable notification appliance 110 is replaced then the controller 200 can automatically restore the prior appliance's configuration from the archived copy.

Reflash program: In the exemplary embodiment, the controller 200 is configured to reflash one or more of the addressable notification appliances 110 with updated software and/or firmware. This is advantageous in that an existing investment in a system 190 having an INAC 110 can be brought forward as functionality is expanded and/or codes & standards change.

Test modes: Using the handheld device 170, IR, RF or other type of electromagnetic communications can be used to exercise and test individual and/or small subsets of the addressable notification appliances 110 in order to minimize disturbance in an occupied building, installation, campus, etc.

Security: In an embodiment, encryption and authentication services are provided by the controller 200 to ensure that an installer and/or user have authority to change addressable notification appliance characteristics via wireless signal 180. In such an embodiment, the controller 200 comprises a wireless transceiver (213 in FIG. 2) and encryption and/or authentication programs stored in the memory 219, together with supporting data, such as look-up tables.

Efficient power usage: The power delivered by the controller 200 can be divided up between the various soft circuits 130, 140 150, 170, 173, 175, 177 and 179 so that efficient use of the controller capacity is utilized. Instead of capacity for audio, visual, audible, etc being supplied by individual physical circuits, each with excess capacity, now the single physical circuit capacity can be divided as needed across all of the soft circuits 130, 140 150, 170, 173, 175, 177 and 179.

Supervised power distribution: Power from the power supply 211 can be delivered for various safety functions in a fully supervised manner. This power can be used for functions such as wireless sensor signal repeaters allowing extended ranges for wireless smoke detectors.

Additionally, the INAC 100 of FIG. 1 can be configured to interconnect with and support conventional reverse polarity notification systems, to allow for the incremental conversion of an installation from conventional notification devices to embodiments of the addressable notification appliances described herein.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. An intelligent notification appliance circuit, comprising:
   one or more addressable notification appliances; and
   a controller operative to transmit a conditioned power signal mixed with an analog audio signal and a control signal to the one or more addressable notification appliances when the controller is coupled with the one or more addressable notification appliances via a single pair of wires, the control signal being a different signal than the audio signal, the control signal configured to (i) change a volume of a notification generated by one or more addressable notification appliances and (ii) initiate a test of the one or more addressable notification appliances.

2. The intelligent notification appliance circuit of claim 1, wherein the controller comprises:
   a microprocessor having a memory and configured to output at least one of a digital audio signal and a control signal;
   an audio decoder coupled with the microprocessor and operative to convert the digital audio signal received from the microprocessor into the analog audio signal;
   a power conditioner operative to output the conditioned power signal; and
   a signal and power mixer operative to mix the conditioned power signal with the analog audio signal and the control signal.

3. The intelligent notification appliance circuit of claim 2, wherein the analog audio signal is encoded for baseband signalling or FM signalling and the control signal is encoded for AM signalling.

4. The intelligent notification appliance circuit of claim 1, wherein at least one of the one or more addressable notification appliances comprises:
   a microprocessor having a memory and operative to process the control signal;
   a data decoding filter operative to isolate the control signal from the conditioned power signal, to decode the isolated control signal, and to output the isolated, decoded control signal to the microprocessor for processing; and
   a first light generator coupled with the microprocessor and configured to illuminate in response to the processed control signal.

5. The intelligent notification appliance circuit of claim 4, wherein the at least one of the one or more addressable notification appliances further comprises:
   a power conditioning unit coupled with the microprocessor;
   a wakeup filter coupled between the power conditioning unit and the microprocessor, wherein the wakeup filter is operative to isolate a wakeup signal from the conditioned power signal; and
   a data encoder coupled with the microprocessor and operative to encode a monitoring signal outputted by the microprocessor for transmission over the single pair of wires.

6. The intelligent mass notification appliance circuit of claim 4, wherein the at least one of the one or more addressable notification appliances further comprises:
   a wireless transceiver coupled with the microprocessor.

7. The intelligent mass notification appliance circuit of claim 4, wherein the at least one of the one or more addressable notification appliances further comprises:
   a second light generator coupled with the microprocessor;
   a graphical and/or textual generator coupled with the microprocessor;
   an audio filter operative to isolate the analog audio signal from the conditioned power signal, to decode the isolated analog audio signal, and to output the isolated, decoded analog audio signal;
   an amplifier coupled with the audio filter and operative to receive the isolated, decoded analog audio signal; and
   a speaker coupled with the amplifier.

8. The intelligent mass notification appliance circuit of claim 7, wherein the second light generator is a mass notification strobe.

9. The intelligent notification appliance circuit of claim 1, wherein at least one of the one or more addressable notification appliances is configured to be a component of a soft circuit.

10. An addressable notification appliance configured to couple with a single pair of wires, the addressable notification appliance comprising:
    a power conditioning unit configured to receive power sent from a controller over the single pair of wires;
    a microprocessor coupled with the power conditioning unit;
    a wakeup filter coupled between the microprocessor and the power conditioning unit, wherein the wakeup filter is operative to isolate a wakeup signal from a conditioned power signal transmitted by a controller over the single pair of wires;
    a data decoding filter coupled between the microprocessor and the power conditioning unit, in parallel with the wakeup filter, wherein the data decoding filter is operative to isolate the control signal from the conditioned power signal, to decode the isolated control signal, and to output the isolated, decoded control signal to the microprocessor for processing;
    a data encoder coupled between the microprocessor and the power conditioning unit, in parallel with the wakeup filter and the data decoding filter, wherein the data encoder is operative to encode a monitoring signal outputted by the microprocessor for transmission over the single pair of wires;
    an audio filter operative to isolate an analog audio signal from the conditioned power signal, to decode the isolated analog audio signal, and to output the isolated, decoded analog audio signal;

an amplifier coupled with the audio filter and operative to receive the isolated, decoded analog audio signal; and a speaker coupled with the amplifier;

the control signal being a different signal than the audio signal, the control signal configured to (i) change a volume of a notification generated by the addressable notification appliance and (ii) initiate a test of the addressable notification appliance.

11. The addressable notification appliance of claim 10, further comprising:

a wireless transceiver coupled with the microprocessor; and a light generator coupled with the microprocessor.

12. The addressable notification appliance of claim 10, further comprising:

a graphic/text generation unit coupled with the microprocessor.

13. A controller for use in an intelligent notification appliance circuit and configured to couple with a single pair of wires, the controller comprising:

a microprocessor having a memory and configured to output a digital audio signal and a control signal;

an audio decoder coupled with the microprocessor and operative to convert the digital audio signal received from the microprocessor into the analog audio signal;

a power conditioner operative to output the conditioned power signal; and a signal and power mixer operative to mix the conditioned power signal with the analog audio signal and the control signal;

the control signal being a different signal than the audio signal, the control signal configured to (i) change a volume of a notification generated by the addressable notification appliance and (ii) initiate a test of the addressable notification appliance.

14. The intelligent notification appliance circuit of claim 13, wherein the analog audio signal is encoded for baseband signalling or FM signalling and the control signal is encoded for AM signalling.

15. The controller of claim 13, further comprising:

a wireless transceiver coupled with the microprocessor and configured to receive a wireless signal from a handheld device.

16. The controller of claim 15, wherein the wireless signal comprises an installer command to be relayed over the single pair of wires to the one or more addressable notification appliances.

17. The controller of claim 15, wherein the wireless signal comprises a user command to be relayed over the single pair of wires to the one or more addressable notification appliances.

* * * * *